No. 833,885. PATENTED OCT. 23, 1906.
H. W. LOCKE.
CAMERA.
APPLICATION FILED MAY 16, 1904.
4 SHEETS—SHEET 1.
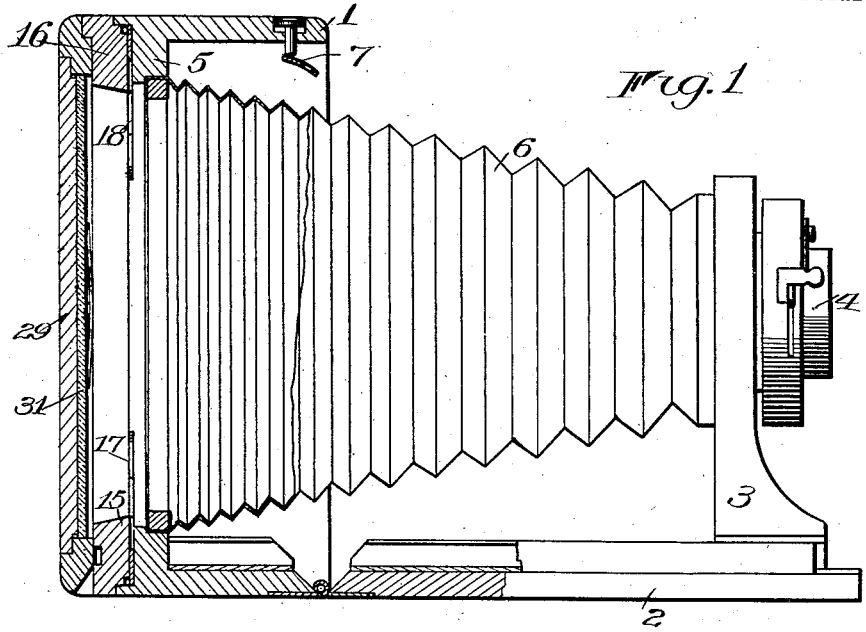
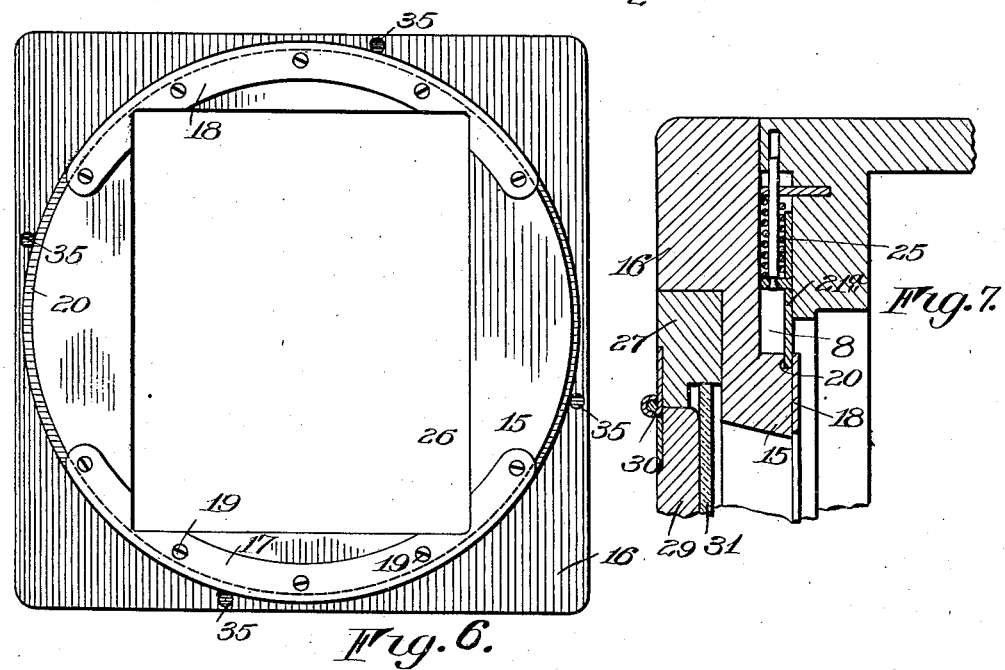
Witnesses
Walter B. Payne.
Clarence A. Bateman.
Inventor
Harvey W Locke
By Frederick S Church
his Attorney No. 833,885. PATENTED OCT. 23, 1906.
H. W. LOCKE.
CAMERA.
APPLICATION FILED MAY 16, 1904.

4 SHEETS—SHEET 2.

Witnesses.

Inventor.

Attorney.

No. 833,885. PATENTED OCT. 23, 1906.
H. W. LOCKE.
CAMERA.
APPLICATION FILED MAY 16, 1904.
4 SHEETS—SHEET 3.
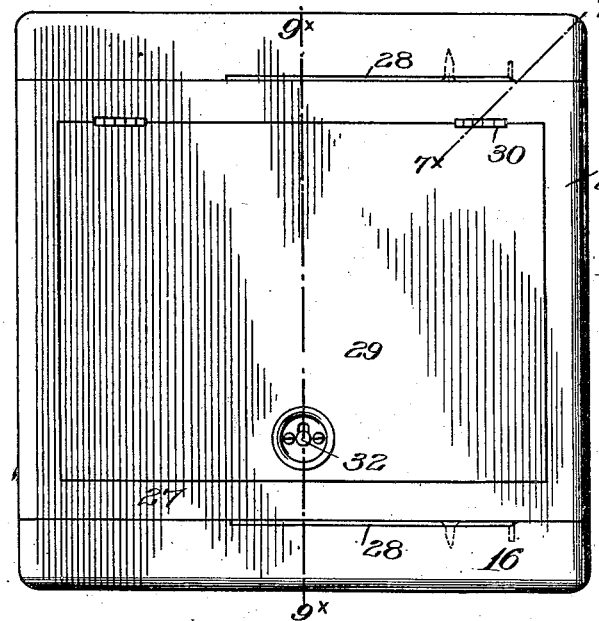
*Fig. 2.ª*
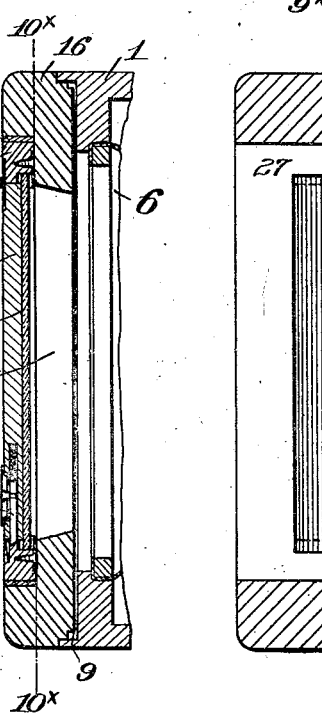
*Fig. 9.*
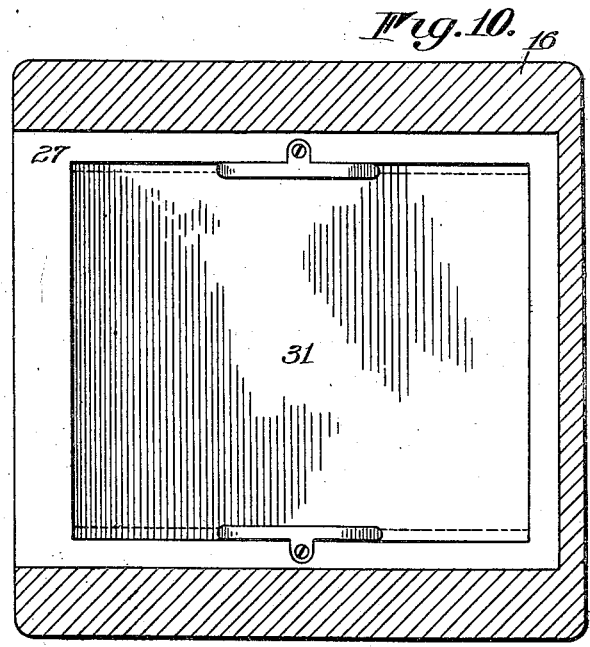
*Fig. 10.*
Witnesses
Walter B. Payne.
Clarence A. Bateman.
Inventor
Harvey W. Locke
By Frederick S. Church
his Attorney No. 833,885. PATENTED OCT. 23, 1906.
H. W. LOCKE.
CAMERA.
APPLICATION FILED MAY 16, 1904.

4 SHEETS—SHEET 4.

Witnesses
Walter B. Payne.
Clarence A. Bateman.

Inventor
Harry W. Locke
By Frederick S. Church
Attorney

UNITED STATES PATENT OFFICE.

HARVEY W. LOCKE, OF ROCHESTER, NEW YORK, ASSIGNOR TO THE CENTURY CAMERA COMPANY, OF ROCHESTER, NEW YORK, A CORPORATION OF NEW YORK.

CAMERA.

No. 833,885.   Specification of Letters Patent.   Patented Oct. 23, 1906.

Application filed May 16, 1904. Serial No. 208,072.

*To all whom it may concern:*

Be it known that I, HARVEY W. LOCKE, of Rochester, in the county of Monroe and State of New York, have invented certain new and useful Improvements in Cameras; and I do hereby declare the following to be a full, clear, and exact description of the same, reference being had to the accompanying drawings, forming a part of this specification, and to the reference-numerals marked thereon.

My present invention relates to cameras; and it has for its object to provide one having a back or closure adapted to carry a holder for containing sensitized material capable of receiving photographic impressions and which is adjustably mounted on the casing to permit the holder to support the sensitized material in the focal plane at any desired position of angular adjustment.

My invention has for its further object to provide a simple and compact arrangement of the parts connecting the back or closure to the casing, whereby the usual appearance of the camera is not altered, and which will permit the back to be readily removed when desired.

To these and other ends the invention consists in certain improvements and combinations of parts, all as will be hereinafter more fully described, the novel features being pointed out in the claims at the end of the specification.

Figure 2:
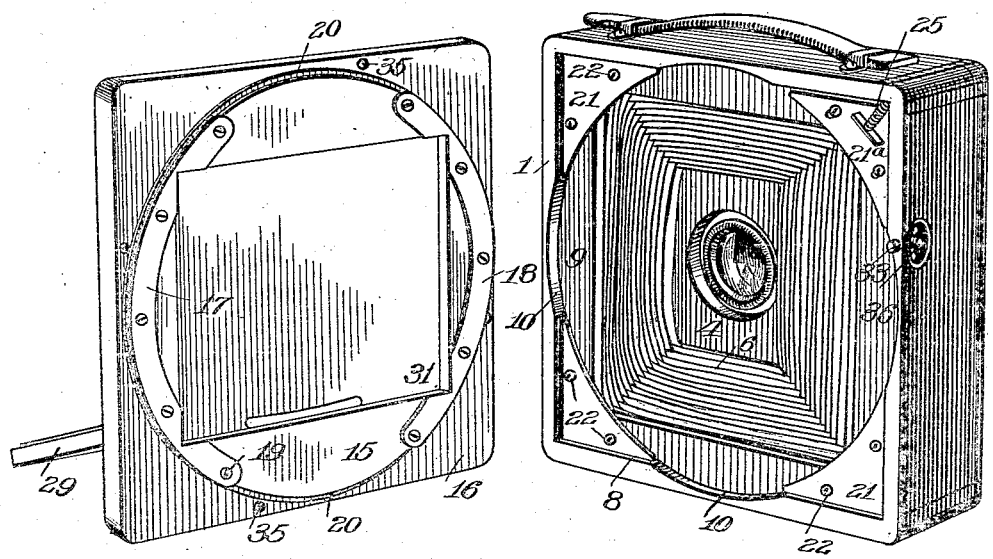
Figure 8:
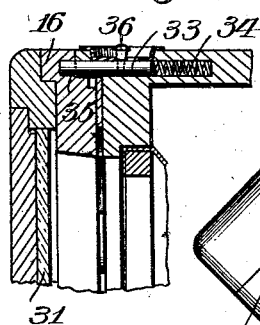
Figure 3:
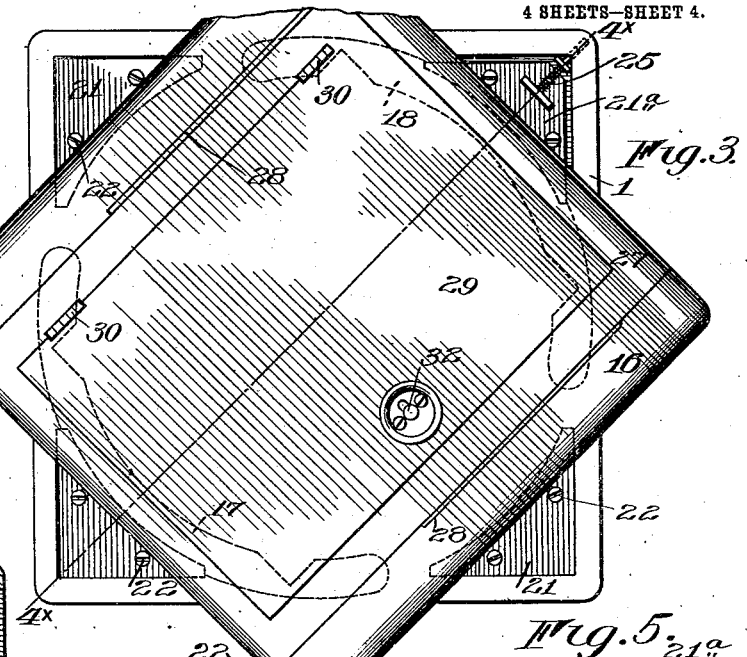
Figure 4:
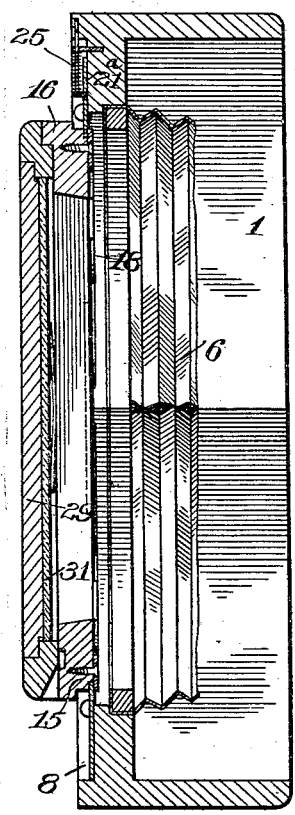
Figure 5:
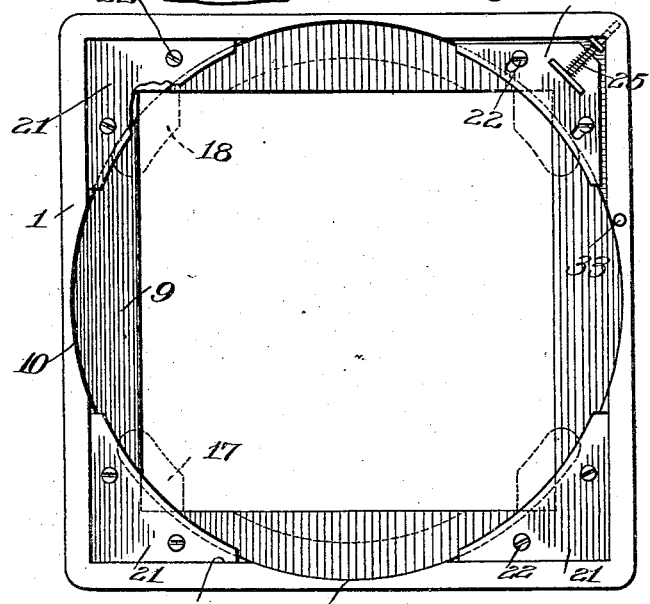

In the drawings, Figure 1 is a longitudinally-sectional view of a camera, showing the parts in the extended or operative position. Fig. 2 is a perspective view of the rear of the camera, showing the back or closure detached. Fig. 2$^a$ is a rear elevation. Fig. 3 is a similar view illustrating the rotary movement of the camera-back. Fig. 4 is a sectional view on the line 4$^\times$ 4$^\times$ of Fig. 3. Fig. 5 is a rear elevation of the camera-casing with the back or closure removed, and Fig. 6 is a view of the inner inside of the camera-back removed from the casing. Fig. 7 is an enlarged sectional view on the line 7$^\times$ 7$^\times$ of Fig. 2$^a$. Fig. 8 is a detail sectional view illustrating the locking device. Fig. 9 is a sectional view on the line 9$^\times$ 9$^\times$ of Fig. 2$^a$, and Fig. 10 is a sectional view on the line 10$^\times$ 10$^\times$ of Fig. 9.

Similar reference-numerals in the several figures indicate similar parts.

In illustrating my invention I have shown it applied to the usual form of folding camera consisting of the hollow rectangular body or casing 1, open at its forward side and having hinged at one edge a bed or extension 2, on which is adjustably mounted the support 3, carrying the lens 4 and between which and the inner partition or wall 5 of the casing extends the light-excluding bellows 6, the aforementioned parts being collapsible and adapted to be contained within the casing 1 when not in use and protected from injury by the front 2, which is secured in position to close the front of the casing by a spring-latch 7, as will be understood.

In the present embodiment of my invention the rear wall or partition 5 is located slightly within the rear edge of the casing 1, forming therein a shallow rectangular recess 8, as shown particularly in Figs. 1 and 4. Also provided in the rear side of the casing is a circular recess 9, which is made slightly deeper than the rectangular aperture 8 and is also larger in diameter than the latter, so that portions of the sides of the rectangular aperture are removed, as indicated at 10 in Fig. 5. Into this circular aperture extends a hub 15, projecting from the inner side of the back or closure 16 and which is provided with a track, preferably formed by two segmental plates 17 and 18, attached thereto by screws 19 and having their edges extending over an annular channel or groove 20, formed on the hub. Engaging over the edges of the track-plate are securing members in the form of triangular plates 21, which are secured to the wall 5 of the casing by screws 22, their inner edges being curved and projecting into the circular recesses, as shown in Fig. 5, and adapted to engage the wall of the recess or channel 20 to form a bearing for the hub. While the track on the back or closure may be in the form of a complete circle or ring, I prefer to construct it of the two segmental plates 17 and 18, arranged at opposite sides of the hub 15, each of which is of sufficient length to engage two of the securing members or plates 21 when the closure or back is in its normal position on the casing, as illustrated in dotted lines in Fig. 5, as this arrangement permits the track to be disengaged from the securing members or plates located at diagonal corners of the casing when the back is given a partial rotation, as will be understood from an inspection of Fig. 3. When the back is rotated into the position shown in Fig. 3, the several corner-plates are visible, and the plate or securing member 21ª being provided with elongated apertures through which its securing-screws pass may be retracted against the tension of the spring 25 to disengage it from one of the track-plates, permitting the back to be detached and removed from the casing by a slight lateral movement sufficient to disengage the oppositely-arranged track-plate from the plate or member 21.

The back or closure is provided with the central rectangular aperture 26, the limits of which are prescribed by the circular hub, and as the aperture is somewhat smaller than it would otherwise be in a camera of corresponding size the walls of the aperture are beveled outwardly, as shown, at such an angle that the sides extend substantially parallel to the rays of light emerging from the lens, thus enlarging the focal plane of the camera. This feature permits the back or closure to be attached in the manner described to the standard sizes of cameras without increasing the size of the casing or decreasing the area of tne focal plane. The aperture is normally closed at its outer side by a relatively movable cover 27, mounted upon the supporting-arms 28, adapted to permit its outward movement and allow a photographic-plate holder to be inserted and secured in alinement with the aperture 26, as will be understood. Also arranged in the cover is a door 29, supported at one side by hinges 30 and normally held in closed position over the interiorly-arranged ground-glass focusing-screen 31 by means of a spring-latch 32. In order to secure the camera-back in its various positions of adjustment, so that an exposure may be made upon a photographic plate or other sensitized material with the longer axis thereof extending either horizontally or vertically, a latch device is mounted upon the casing 1, consisting of a pin or bolt 33, which is normally projected beyond the rear edge of the casing by a spring 34 and adapted to automatically engage with one of a series of apertures 35, provided in the inner face of the camera-back 16. The bolt 33 is provided with a button or head 36, by means of which it may be retracted, and in locating the latch in the casing it is arranged in such a position that when the bolt is in a retracted position and the camera-back revolved the face of the latter will overlie it and hold it in the inoperative position until one of the apertures registers therewith, when the spring 34 will cause it to be projected to lock the parts.

While I have illustrated my invention as applied to a camera adapted to receive a plate-holder, it will be understood that the invention may also be embodied into parts employed for attaching a roll-holder or other device and the arrangement of the parts whereby such attachments may be readily disconnected enables an operator to employ a single camera with any form of closure or back he may desire to use.

I claim—

1. In a camera, the combination with a rectangular casing open at its rear side and a rectangular closure therefor extending over the entire back of the casing and journaled thereon, of means for detachably connecting the closure to the casing.

2. In a camera, the combination with a casing having a circular recess formed in its rear side, of a closure for the casing journaled in said recess and means for securing it therein which is movable to permit the removal of the closure.

3. In a camera, the combination with a casing having a circular recess formed in its rear side, of a closure for the casing equal in area thereto and having a hub of lesser diameter on its face journaled in the recess and devices located between the closure and casing and engaging the hub.

4. In a camera, the combination with a casing having a circular recess formed in its rear side, of a camera-back journaled in the recess and plates having overlapping edges and mounted respectively on the casing and camera-back, one of said plates being movable out of engagement with the other to detachably connect the parts.

5. In a camera, the combination with a casing, of a reversible back therefor, plates having overlapping edges mounted on the casing and back and forming a journal for the latter, one of said plates being movable out of engagement with the other and a device for locking the back in operative position on the casing.

6. In a camera, the combination with a hollow rectangular casing and a reversible back having a central aperture, of a hub surrounding the latter and journaled in the casing, a circular track-plate on the hub and securing members arranged in the corners of the casing and overlapping the edge of the track-plate.

7. In a camera, the combination with a hollow rectangular casing, and a reversible back journaled thereon, of a circular track formed on the back, members arranged in the corners of the casing and engaging the edge of the track and means for retracting one of said members to permit the removal of the back from the casing.

8. In a camera, the combination with a casing, and a back journaled thereon having a circular track, of a stationary member and a relatively movable member mounted on the casing and adapted to engage in rear of the track at opposite sides of the track.

9. In a camera, the combination with a rectangular casing, and a back journaled thereon having a circular track, of a plate secured in one corner of the casing having the edge engaging in rear of the track and a similar plate movably mounted in the diagonally opposite corner of casing and adapted to coöperate with the track to removably secure the back to the casing.

10. In a camera, the combination with a casing, and a wall inset therein from the edges of the casing having a recess, of a closure for the casing having a projection extending into the recess, devices on the wall within the casing forming a bearing for the closure and a track on the latter engaging in front of said devices.

11. In a camera, the combination with a casing, and a wall therein having a recess, of a closure for the casing having a projection extending into the recess, bearing members on the wall engaging the projection and forming a bearing for the closure and a track on the projection extending in front of the bearing member.

12. In a camera, the combination with a casing, and a wall therein having a recess, of a closure for the casing having a circular projection extending into the recess and provided with an annular channel, of bearing members attached to the wall and extending into said channel and engaging the bottom of the latter to center the closure.

13. In a camera, the combination with a casing and a wall therein provided with a recess, of a closure for the casing having a projection extending into said recess and provided with an annular channel, stationary and movable bearing members on the wall extending into the channel at opposite sides of the projection and means for normally holding the movable member in the operative position.

14. In a camera, the combination with a casing and a wall therein provided with a recess, of a closure for the casing having a projection extending into said recess and provided with an annular channel, a plurality of bearing-plates mounted on the wall having curved edges lying in the channel and engaging the bottom of the latter to center the closure.

15. In a camera, the combination with a rectangular casing and a wall inset within the edge thereof and provided with a circular aperture, of a closure for the casing having a hub extending into the aperture and provided with a channel, bearing-plates secured at the corners of the wall within the casing having curved edges extending into the channel.

16. In a camera, the combination with a rectangular casing, and a wall located within the edges thereof and provided with a circular aperture, of bearing-plates mounted at the corners of the wall having their edges extending into the aperture, one of said plates being movable to permit its edge to be retracted, a closure for the casing having a hub journaled between said bearing-plates and tracks formed at opposite sides of the hub and extending in front of the plates at adjacent corners of the wall when the closure is in normal position.

17. In a camera, the combination with a casing and a reversible back journaled thereon and completely covering the end of the casing having a face engaging the casing, of a locking device on the casing coöperating with the face of the closure to secure the latter in operative position.

18. In a camera, the combination with a casing having an end face and a reversible back journaled thereon and extending over the entire face of the casing having a face engaging said end face, of a latch mounted on one of the parts and coöperating with the face on the other to secure them in operative position.

19. In a camera, the combination with a casing and a reversible back journaled thereon, which completely covers the end of the casing and has apertures arranged therein, of a latch embodying a spring-operated bolt adapted to engage said apertures arranged in the casing and adapted to be held in the inoperative position when the closure is rotated.

20. In a camera, the combination with a casing and a reversible back or closure journaled thereon which completely covers the end of the casing, of a locking device mounted on one of the parts embodying an engaging member adapted to coöperate with the other part, said locking device being so arranged that the engaging member is held in the inoperative position when the back is rotated out of its normal position.

21. In a camera, the combination with a casing, and a closure therefor comprising a wall having a projection extending into the casing and provided with an aperture having rearwardly and outwardly extending walls, of connections between the projection and the casing forming a journal-bearing for the closure within the casing.

HARVEY W. LOCKE.

Witnesses:
RUSSELL B. GRIFFITH,
FLORENCE N. HOWARD.